United States Patent
Alabiso

(10) Patent No.: US 8,806,427 B2
(45) Date of Patent: Aug. 12, 2014

(54) SERVICE PLUG-IN AND SERVICE BASE FOR AN INTEGRATED SERVICE FRAMEWORK

(75) Inventor: James R. Alabiso, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 203 days.

(21) Appl. No.: 13/469,771

(22) Filed: May 11, 2012

(65) Prior Publication Data
US 2013/0305217 A1 Nov. 14, 2013

(51) Int. Cl.
*G06F 9/44* (2006.01)

(52) U.S. Cl.
USPC .......................................................... 717/106

(58) Field of Classification Search
CPC ................ G06F 8/20; G06F 8/30; G06F 8/36
USPC .......................................................... 717/106
See application file for complete search history.

(56) References Cited

U.S. PATENT DOCUMENTS

| | | | |
|---|---|---|---|
| 2003/0093582 A1* | 5/2003 | Cruz et al. | 709/328 |
| 2005/0160421 A1* | 7/2005 | Bluvshteyn et al. | 717/174 |
| 2008/0092149 A1* | 4/2008 | Rowbotham et al. | 719/321 |
| 2008/0163179 A1* | 7/2008 | Arnold et al. | 717/129 |
| 2008/0178190 A1* | 7/2008 | Anstey et al. | 718/104 |
| 2009/0157809 A1* | 6/2009 | Defrang et al. | 709/203 |

* cited by examiner

*Primary Examiner* — Li B Zhen
*Assistant Examiner* — Bradford Wheaton
(74) *Attorney, Agent, or Firm* — Michael A. Springs; Moore & Van Allen PLLC; Jeffrey R. Gray

(57) ABSTRACT

Embodiments of the invention provide for methods, systems and computer program products for an integrated service framework with a suite of products that provide a development environment and common framework for programming within an operating system. The programmers write code to develop class plug-ins within the structure of the abstract class in order to perform services. The abstract class provides a standardized structure that may be utilized by all of programmers working within the integrated service framework to reduce redundant programs. The user creates the code for the class plug-ins that run services within the structure of the abstract class in order to allow the service to configure and run properly. If the class plug-in does not properly use the structure provided by the abstract class the class plug-in will not work properly, and thus, would not configure.

21 Claims, 10 Drawing Sheets

SERVICE PLUG-IN AND SERVICE BASE FOR AN INTEGRATED SERVICE FRAMEWORK

BACKGROUND

Computer programing is a subjective process that involves writing code to develop programs (e.g., applications, applets, software, etc.) for use on different operating systems. When provided with the same task to develop a particular program to provide a service, multiple programmers would write code for the program, and it is likely that no two sets of code for the program would be the same. The multiple programmers would use different algorithms, methods, languages, etc. to create a program to perform the same service, however, the programing code would not be exactly alike. A programmer would typically create programs from scratch and may copy code from other programs to perform various tasks within the program. However, the code and structure of the program used to provide the services is left largely to the each individual programmer. This method of creating programs results in inefficiencies in the programing process that increase the costs associated with the time it takes a programmer to develop a program to provide a service, as well as the time it takes other programmers to interface with the program.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, methods, apparatus systems and computer program products are described herein for an integrated service framework with a suite of products that provide a development environment and common framework for programming within an operating system. The integrated service framework provides an abstract class that sets out a structure or blueprint for programing services within an operating system. The abstract class may include code that performs various tasks which are frequently used by programmers for multiple services. The programmers can then develop code for class plug-ins within the structure of the abstract class. The class plug-ins perform services that execute the tasks within the structure of the abstract class based on the parameters set by the programmers in the class plug-ins. The abstract class provides a standardized structure that may be utilized by all programmers working within the integrated service framework to reduce the time it takes to write code for redundant programs or parts of programs that provide the same tasks or services. For example, as an analogy, in one embodiment of the invention, the abstract class is a blueprint for a building, but it is not an actual building, whereas the class plug-ins are different types of actual buildings that incorporate one or more elements of the blueprint of the building.

The integrated service framework also provides a service manager that identifies the class plug-ins, executes the class plug-ins to run the services, logs information about the services, sends notifications to users about the services, configures itself to monitor the services, and provides a gateway of communication between the services within the integrated service framework. Furthermore, the integrated service framework also provides a service controller that allows a programmer or an administrator to control, monitor, query, troubleshoot, and resolve any issues that occur with the services by sending commands to the services both within and outside of the integrated service network.

Embodiments of the invention comprise systems, computer program products, and methods for providing a service manager for an integrated service framework. The integrated service framework provides a worker base product and a worker plug-in product within an integrated service framework. The worker base product accesses an abstract class that provides a structure for developing one or more class plug-ins. The worker plug-in product is used by a user to develop the one or more class plug-ins for a service. The user may develop a service by developing the one or more class plug-ins within the structure of the abstract class, wherein the user develops the code for a portion of the service in the one or more class plug-ins and accesses standardized code for a portion of the services in the abstract class within the integrated service framework.

In further accord with an embodiment of the invention, the abstract class provides the structure in which the user is forced to develop the code for the one or more class plug-ins.

In another embodiment of the invention, the structure requires the user to include command functions from the abstract class within the one or more class plug-ins without executing the command functions.

In yet another embodiment of the invention, the abstract class incorporates one or more secondary abstract classes without the one or more class plug-ins directly incorporating the one or more secondary abstract classes.

In still another embodiment of the invention, the one or more class plug-ins or the abstract class include code that a service manger product uses to store service information in a log.

In further accord with an embodiment of the invention, the one or more class plug-ins or the abstract class include code for threshold limits that a service manager product uses to provide notifications to users when the services violate the threshold limits.

In another embodiment of the invention the user is allowed to amend the abstract class to change the structure or add new structure to the abstract class for use by the one or more class plug-ins.

To the accomplishment the foregoing and the related ends, the one or more embodiments comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
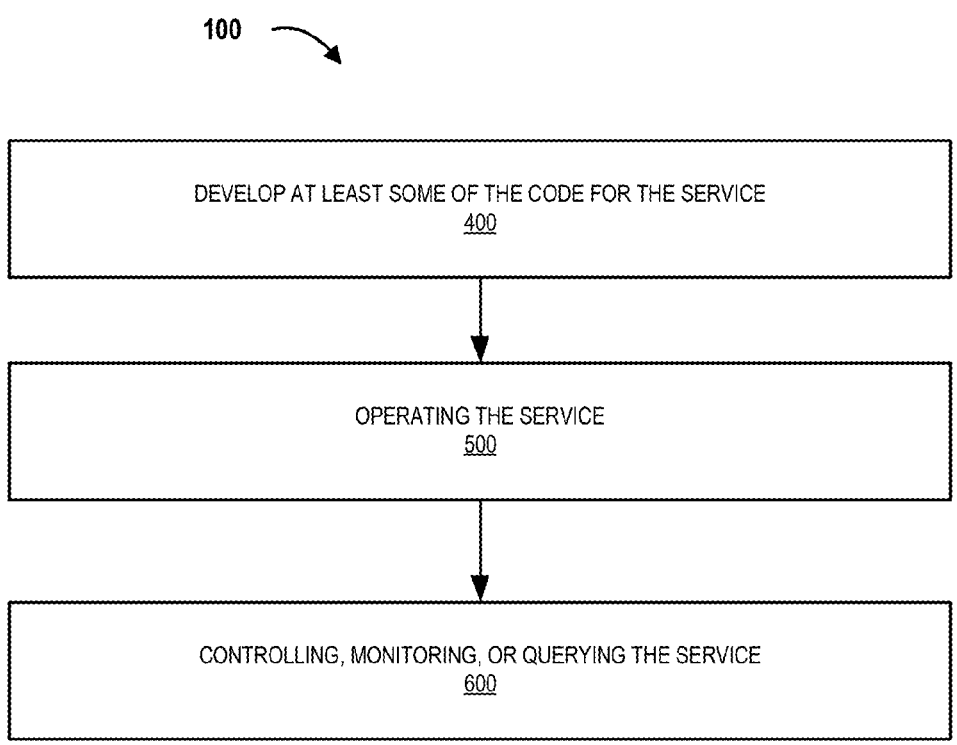
Figure 2:
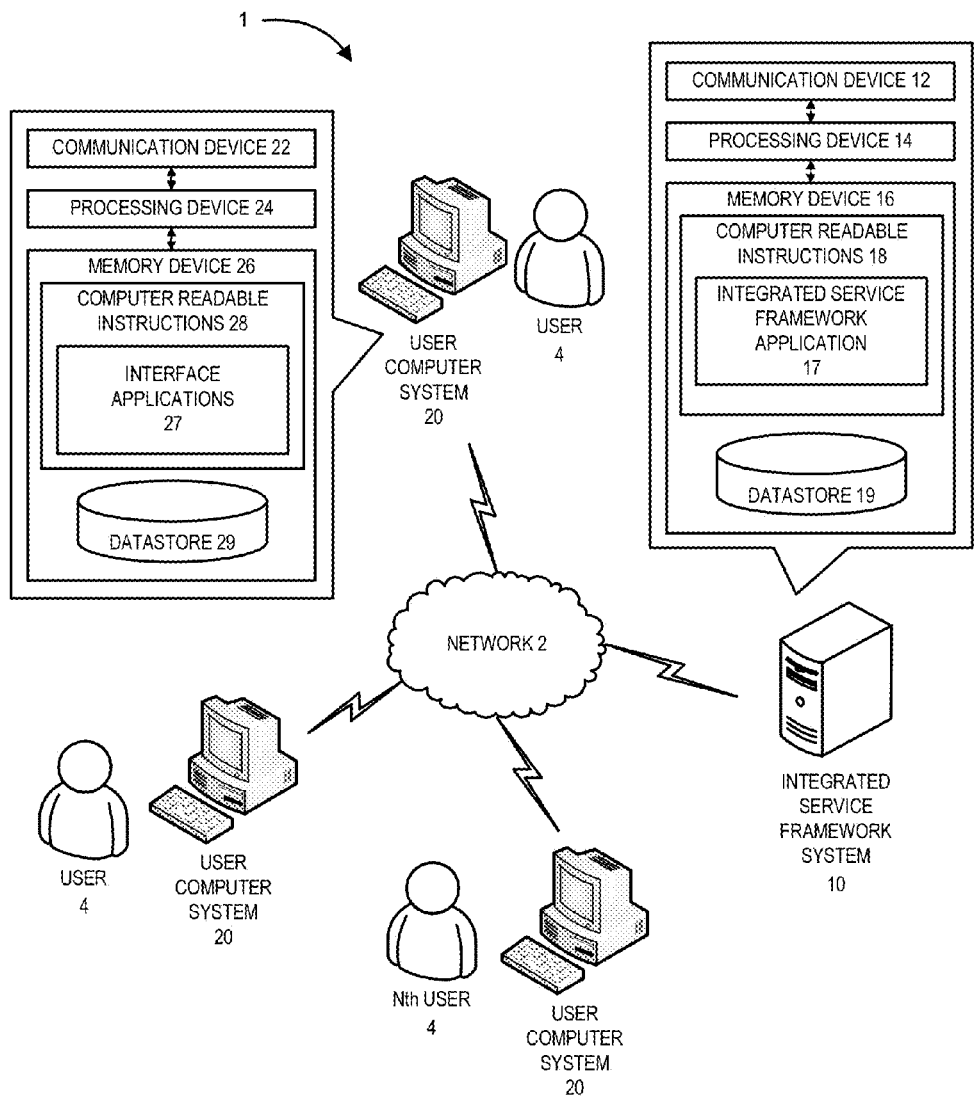
Figure 3:
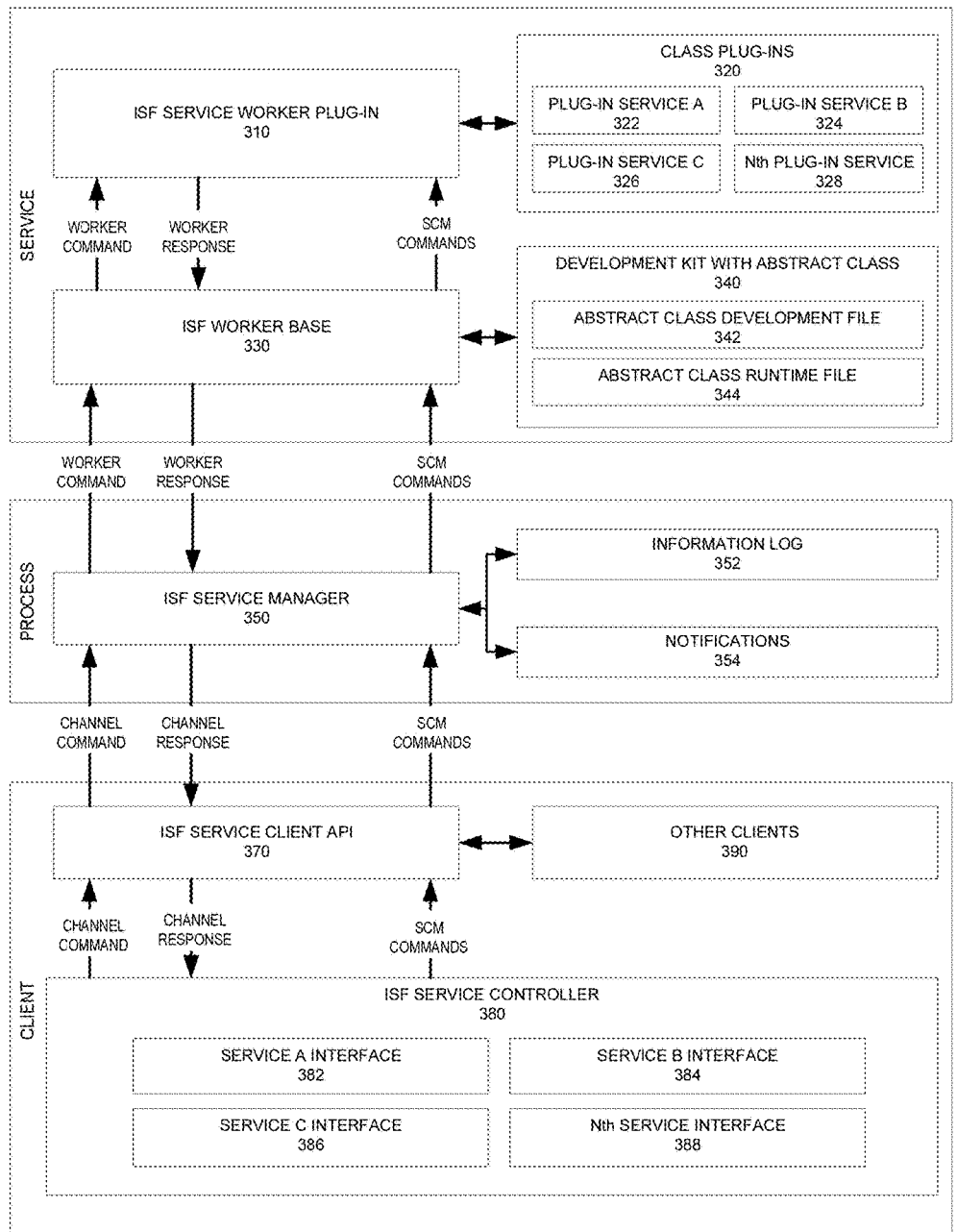
Figure 4:
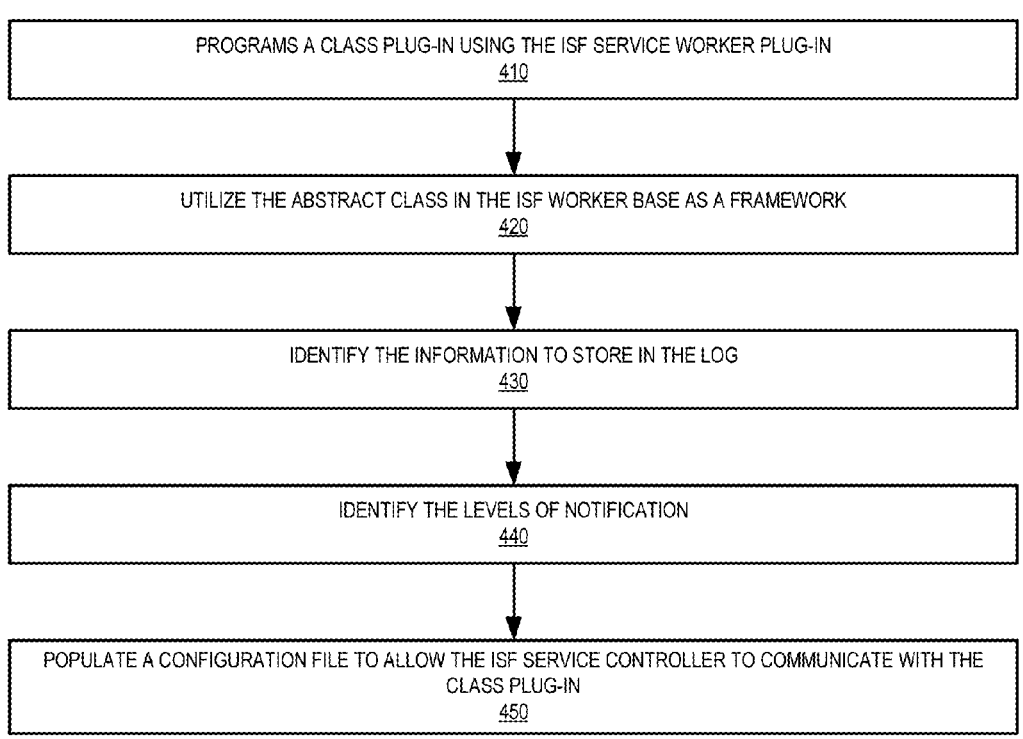
Figure 5:
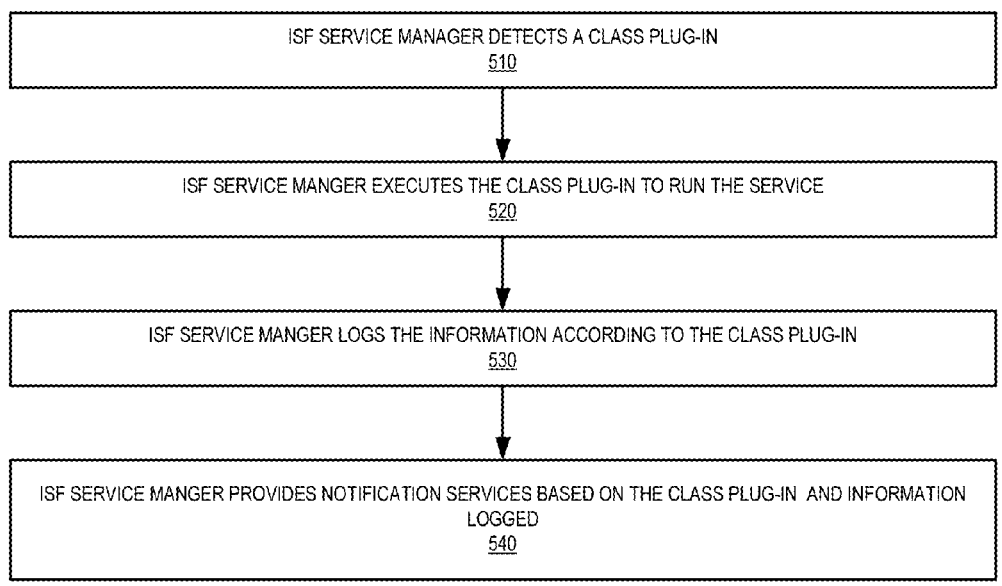
Figure 6:
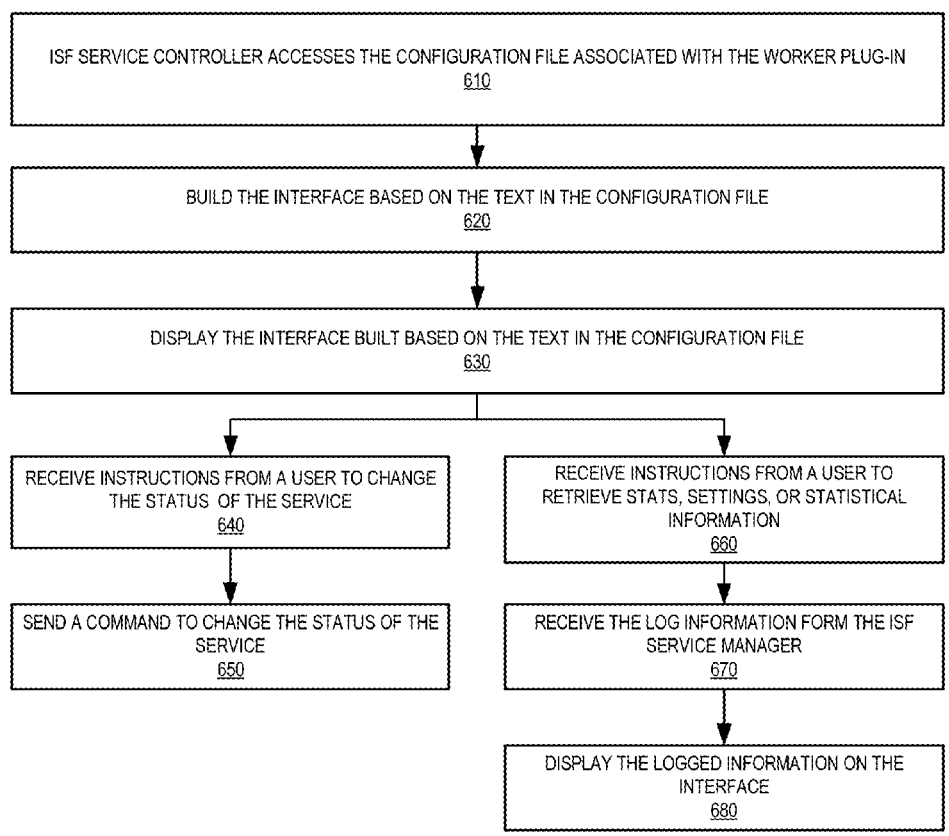
Figure 7:
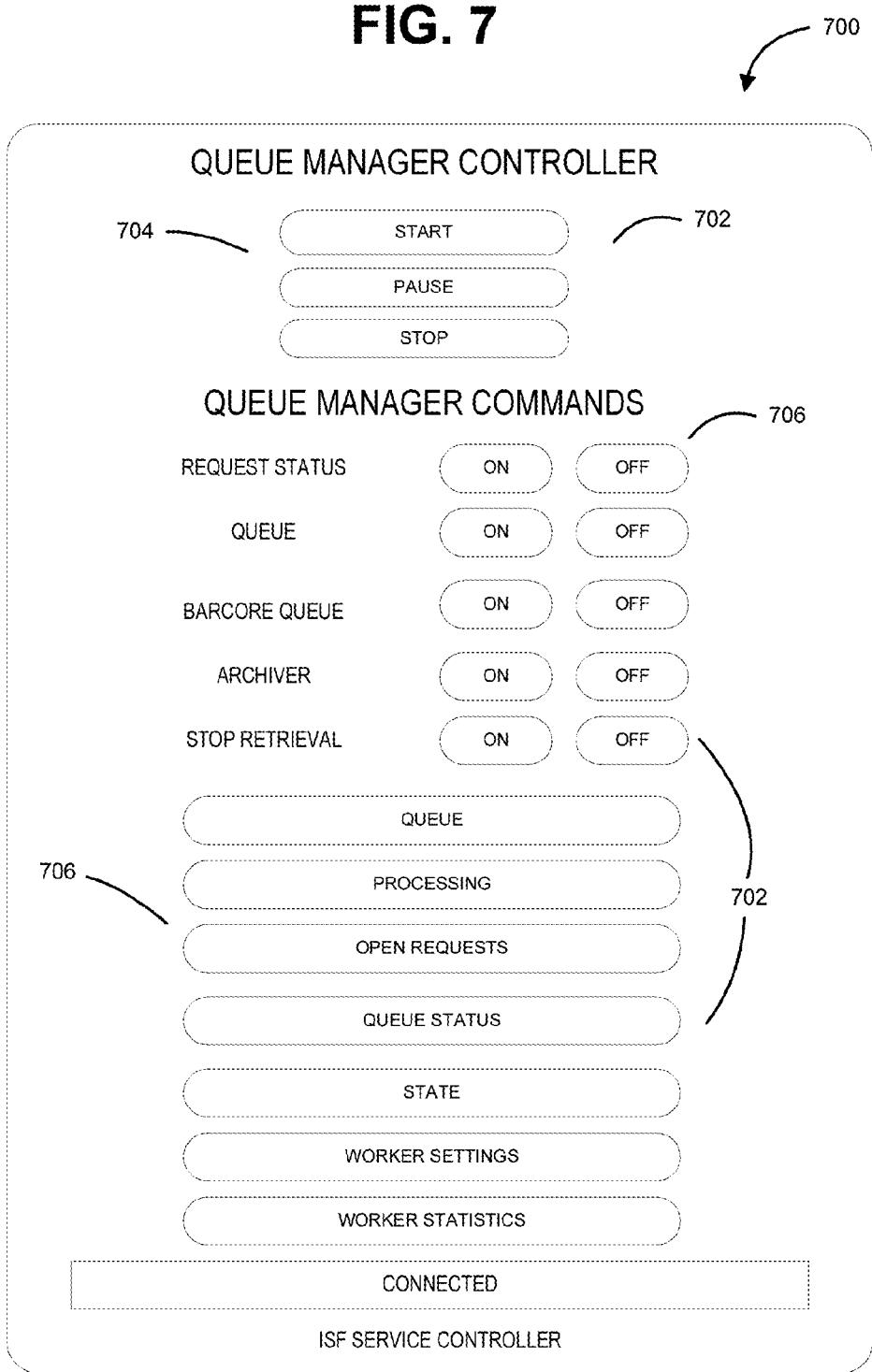
Figure 8:
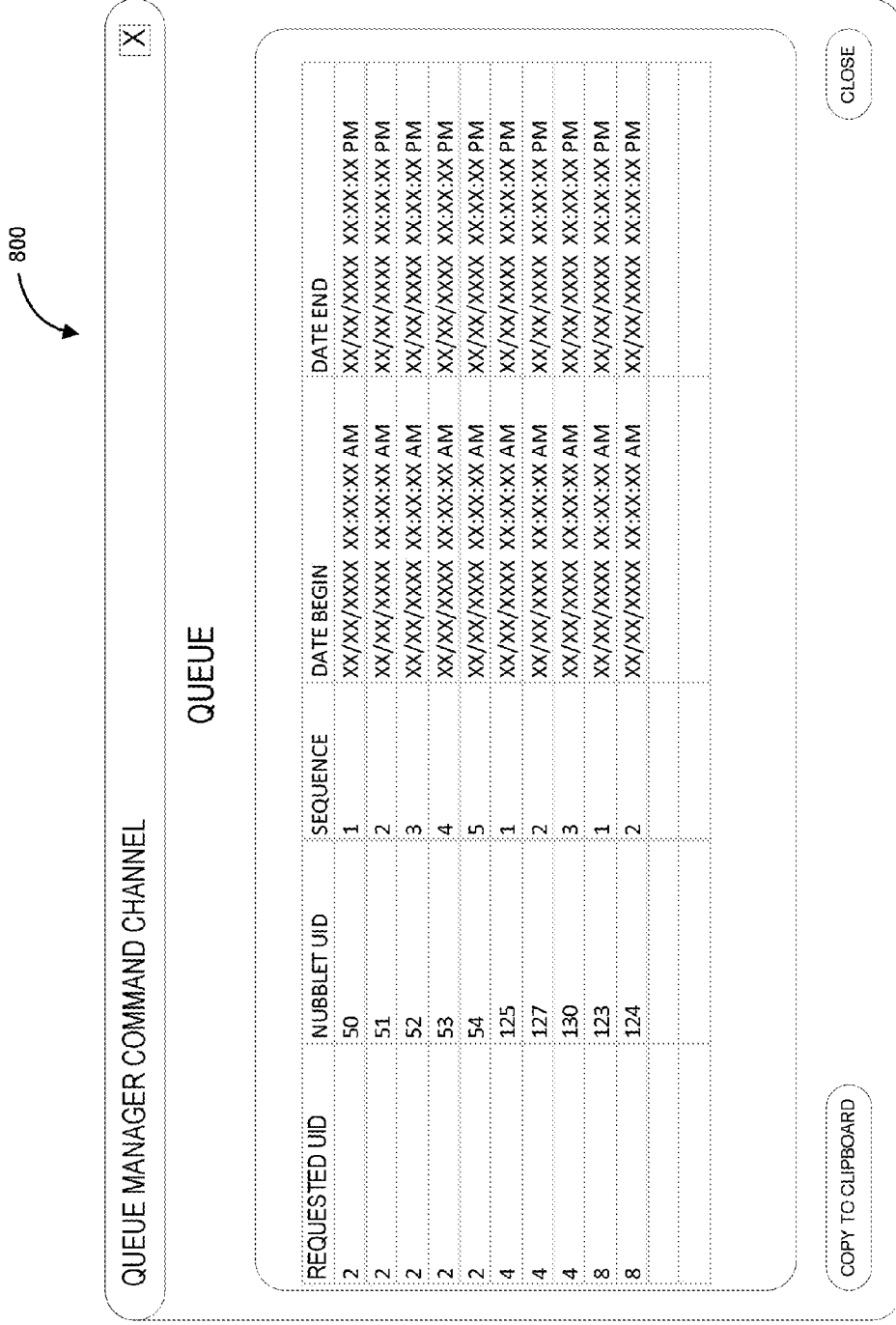
Figure 9:
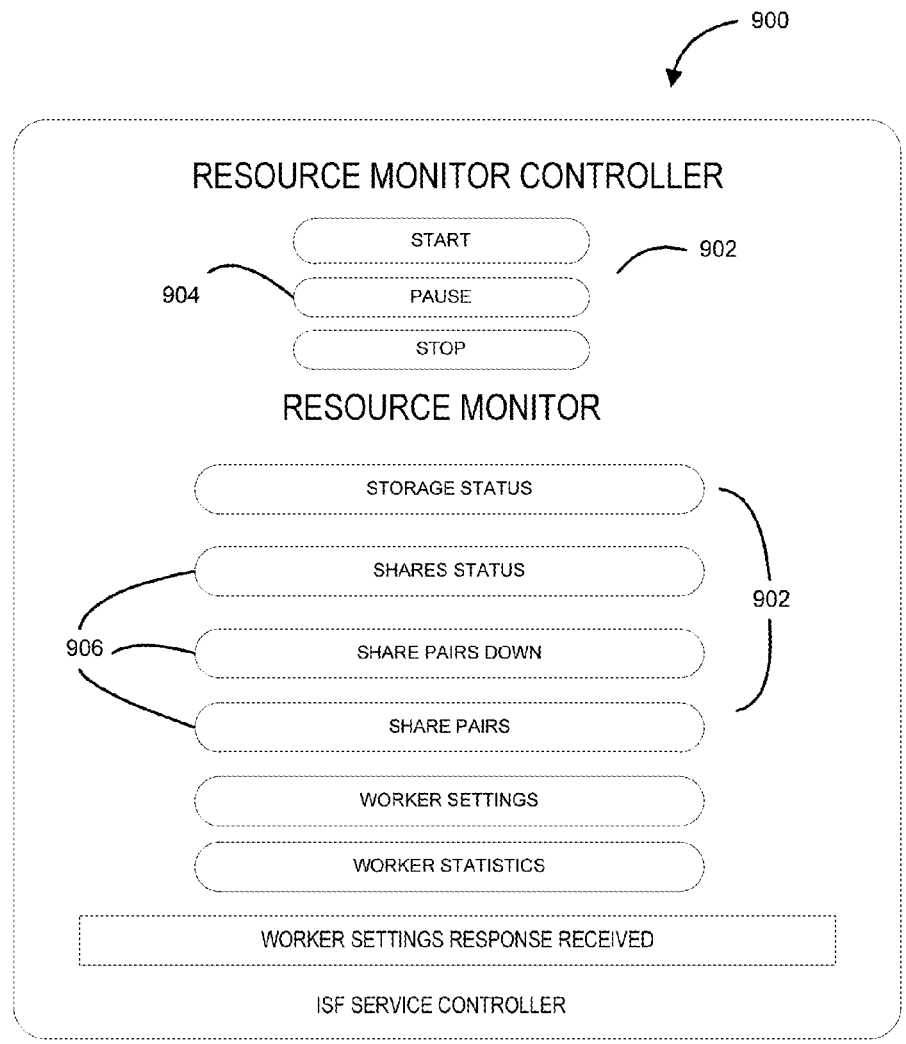
Figure 10:
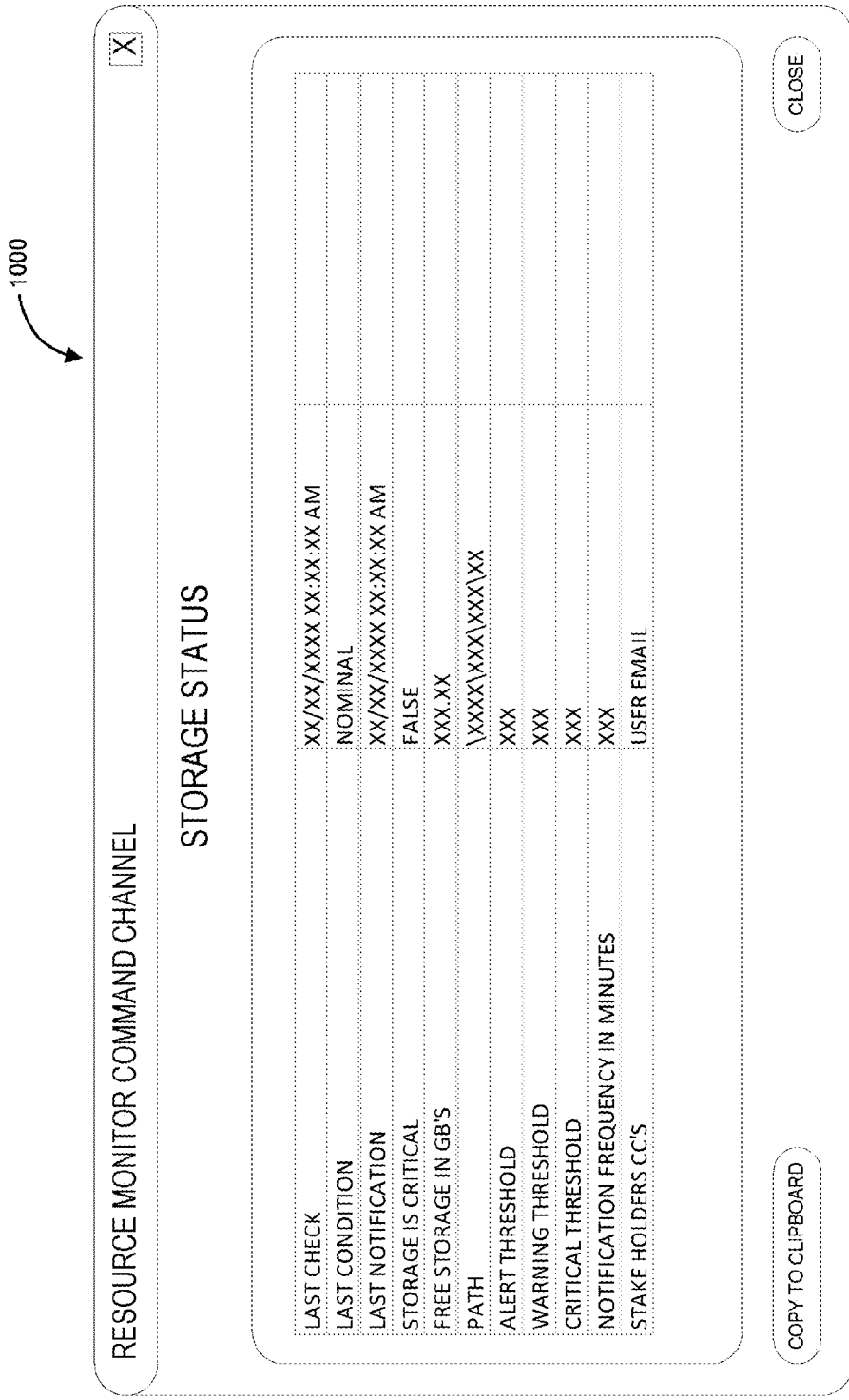

Having thus described embodiments of the invention in general terms, reference will now be made to the accompanying drawings, which are not necessarily drawn to scale, and wherein:

FIG. 1 is a high level process flow illustrating an integrated service framework process, in accordance with one embodiment of the invention;

FIG. 2 is a block diagram illustrating an integrated service framework environment, in accordance with an embodiment of the invention FIG. 3 is a block diagram illustrating an integrated service framework product interaction, in accordance with an embodiment of the invention;

FIG. 4 is a process flow illustrating a service development process using the integrated service framework, in accordance with an embodiment of the invention;

FIG. 5 is a process flow illustrating a service operation process using the integrated service framework, in accordance with an embodiment of the invention;

FIG. 6 is a process flow illustrating a service control and monitoring a process using the integrated service framework, in accordance with an embodiment of the invention;

FIG. 7 is an interactive monitoring interface created by the service controller in the integrated service framework illustrating a queue service, in accordance with an embodiment of the invention;

FIG. 8 is an interface created by the service controller in the integrated service framework illustrating the statistics of matters in the queue, in accordance with an embodiment of the invention;

FIG. 9 is an interactive monitoring interface created by the service controller in the integrated service framework illustrating a resource monitoring service, in accordance with an embodiment of the invention; and FIG. 10 is an interface created by the service controller in the integrated service framework illustrating the resource storage status, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Thus, methods, systems, computer programs and the like are herein disclosed that provide for an integrated service framework 300 that allows a user 4 (programmer, administrator, etc.) to write code for services (i.e., programs, parts of programs, etc.) within an operating system or across operating systems. The services within the integrated service framework ("ISF") 300 are created through the use of an ISF service worker plug-in 10 product that allows the user to write code to develop class plug-ins 320. While writing the code for the class plug-ins 320 the user utilizes the ISF worker base 330 to develop the class plug-ins 320 within the structure of an abstract class having universal code for methods that are already in place to perform tasks, which reduces the need for redundant programing. The integrated service framework 300 reduces the time and costs associated with developing services.

The integrated service framework 300 also provides a ISF service manager 350 that runs the services, provides communication between the services and clients, auto configures itself, logs information about the services, and sends out notifications about the services.

The integrated service framework 300 also provides an ISF service controller 380 monitoring application that is completely configurable to allow a user 4 to start, stop, and pause (e.g., control) the services, provide the user information (e.g., statistics, run time, etc.) about the services (e.g., monitor), or determine the operating status or settings of the service (e.g., query) within the integrated service framework 300.

FIG. 1 illustrates a high level process flow for an integrated service framework process, in accordance with one embodiment of the invention. As illustrated by block 400 a user 4 creates at least some of the code for a service. Thereafter, as illustrated by block 500 the ISF service manager 350 runs the service based on the constraints provided by the user 4 in the code. Finally, as illustrated by block 600, the ISF service controller 380 sends commands to the service for controlling, monitoring, and querying information regarding the service and displays the information to the user 4 in a automatically configured interface.

FIG. 2 illustrates an integrated service framework system environment 1, in accordance with an embodiment of the present invention. As illustrated in FIG. 2, one or more user computer systems 20 are operatively coupled, via a network 2 to an integrated service framework system 10. In this way one or more users 4 may connect to the integrated service framework system 10 in order to write code to develop programs within the integrated service framework application 17 under a framework that reduces the costs that occur with writing redundant code.

The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network 2.

In some embodiments of the invention the one or more users 4 are programmers or administrators that are either using the integrated service framework system 10 to write code for various services running on an operating system, to run the services on the operating system, to monitor and troubleshoot the services running on the operating system, and to stop, start, and or pause the services running on the operating system.

As illustrated in FIG. 2, a user 4 accesses the integrated service framework system 10 through a user computer system 20. The user computer system 20 may be a desktop, laptop, tablet, mobile device, smartphone device, or any other type of computer that generally comprises a communication device 22, a processing device 24, and a memory device 26. As used herein, the term "processing device" generally includes circuitry used for implementing the communication and/or logic functions of a particular system. For example, a processing device 24 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 24 may include functionality to operate one or more software programs based on computer-readable instructions 28 thereof, which may be stored in a memory device 26.

The processing device 24 is operatively coupled to the communication device 22 and the memory device 26. The processing device 24 uses the communication device 22 to communicate with the network 2 and other devices on the network 2, such as, but not limited to, other user computer systems 20, the integrated service framework system 10, and/or other systems utilized by a business. As such, the communication device 22 generally comprises a modem, server, or other device for communicating with other devices on the network 2 and/or a keypad, keyboard, touch-screen, touch-pad, microphone, mouse, joystick, other pointer device, button, soft key, and/or other input device(s) for communicating with the user 4. As further illustrated in FIG. 2, user computer systems 20 may have computer-readable instructions stored in the memory device 26, which in one embodiment includes the computer-readable instructions of interface applications 27. In some embodiments, the memory device 26 includes a datastore 29 for storing data related to the user computer system 20, including but not limited to data created and/or used by the interface applications 27. The interface applications 27 may be used by the users 4 to access the integrated service framework application for drafting code to create services within the integrated service framework 300 or for controling, monitoring, and querying the services.

As illustrated in FIG. 2, the integrated service framework system 10 generally comprises a communication device 12, a processing device 14, and a memory device 16. The processing device 14 is operatively coupled to the communication device 12 and the memory device 16. The processing device 14 uses the communication device 12 to communicate with the network 2 and other devices on the network 2, such as, but not limited to, the user computer systems 20. As such, the communication device 12 generally comprises a modem, server, or other device for communicating with other devices on the network 2.

As further illustrated in FIG. 2, the integrated service framework system 10 comprises computer-readable instructions 18 stored in the memory device 16, which in one embodiment includes the computer-readable instructions 18 of an integrated service framework application 17. In some embodiments, the memory device 16 includes a datastore 19 for storing data related to the integrated service framework system 10, including but not limited to data created and/or used by the integrated service framework application 17.

The integrated service application 17 is an application used to run the integrated service framework 300 that is described in further detail below. As described in more detail, as follows, the integrated service framework 300 allows a user 4 to create, store, access, and monitor services using class plug-ins that are developed within the structure of an abstract class within the integrated service application 17, and thereafter control and monitor the services using a self-configuring interface.

FIG. 3 illustrates the interaction between the suite of products in the integrated service framework 300. The suite of products in the integrated service framework 300 provide the development environment and common framework for developing services running on an operating system. The services described herein relate to programs, or parts thereof, that perform operations within the operating system. For example, the services may include providing e-mail notifications based on account balances, shipping a product based on an amount spent with a business, monitoring a queue of actions to be taken within an application, or providing any other type of service within a business.

The integrated service framework 300 provides a plug in architecture to minimize the development effort when developing programs for services. The integrated service framework 300 provides inter-process communication among programs (i.e., customer applications, client applications, web interfaces, etc.). The integrated service framework 300 also provides the ability to control, monitor and manage services across the business within a common interface.

The integrated service framework 300 generally comprises products that work in conjunction with each other to develop programs for services and allow the programs to interface with each other. In one embodiment there are generally five products within the integrated service framework 300 comprising an integrated service framework worker plug-in 310 product (hereinafter "ISF worker plug-in"), the integrated service framework service worker base 330 product (hereinafter "ISF worker base"), the integrated service framework service manager 350 product (hereinafter "ISF service manager"), the integrated service framework service client API 370 product (hereinafter "ISF service client API"), and the integrated service framework service controller 380 product (hereinafter "ISF service controller"). In other embodiments of the invention, there may be other products within the integrated service framework 300 that work in conjunction with these, or are a part of these products. In still other embodiments of the invention these products may be combined into one or more single products. For simplicity, the products are described herein as different products within the integrated service framework 300.

The ISF worker plug-in 310 is the only portion of the integrated service framework 300 that requires development effort by a user 4 when building an ISF compatible service. The user 4 creates or develops (i.e., writes code) a class plug-in that defines and/or performs the actual work of a program, or part of a program, which ultimately performs a service. The class is the structure that the user 4 creates when writing code for a program. For example, the user 4 would write code for a class plug-in using the ISF working plug-in 310 to provide a service. The class plug-in may, for example, monitor space on a storage volume database, manage a queue of pending applications that are scheduled to run, send an e-mail based on an account balance, or perform another service. The user 4 can develop any number classes 320 within the integrated service framework 300 to provide any number of different services (e.g., service A 322, service B 324, service C 326, Nth service 328). In order to create one or more of the classes 320 the user 4 utilizes the ISF worker base 330 and implements the required coding methodology laid out through the abstract class, as described in further detail below.

The ISF worker base 330 provides a development kit with an abstract class 340 that provides the structure for the user 4 to implement when developing the class plug-ins using the ISF worker plug-in 310. Basically, the ISF worker base 330 provides a structure of code that has already been written to provide the framework for the user 4 to incorporate into the user's class plug-ins in order to minimize coding and provide a framework for common interaction among services. The ISF worker base 330 allows the user 4 to access the abstract class that the user 4 follows as a template (e.g., abstract class development file 342 and the abstract class runtime file) in order to write the code for the class plug-ins. An abstract class may be programed in a way to require that any class plug-in that implements the abstract class has to implement it using a certain method. In this way the ISF worker base 330 forces the user 4 into creating class plug-ins within the structure of the integrated service framework 300.

For example, the user 4 may develop a class in the ISF worker plug-in 310 for a program to check an account balance and see if it is under a particular level (e.g., $1,000), and thereafter take an action if it is under, such as send an e-mail to the account holder indicating the balance of the account. The user 4 may develop this service by utilizing the abstract class in the ISF worker base 330 that provides a framework for checking an account and sending an e-mail. The user 4 may only need to program a class plug-in with the balance amount (e.g., $1000) needed to trigger the e-mail, and provide the actual text content of the e-mail if the account falls below the balance amount. The user 4 may simply execute the class plug-in based on the structure of the abstract class that is located within the ISF worker base 330. The ISF worker base prevents a user 4 from having to repeat past programming that has already been developed to support the services within the integrated service framework 300.

The ISF worker base 330 provides a loose framework in which users 4 of the integrated service framework 300 are allowed to program services. The abstract class accessed through the ISF worker base 330 is a template for running services or parts of services. The commands used by two users 4 to execute class plug-ins within the framework of the abstract class can be made up as each of the users 4 develop each of their own class plug-ins in the ISF worker plug-in 310. However, both users 4 develop each of their own class plug-ins within the structure of the abstract class in the ISF worker base 330. For example, one user 4 may create a class plug-in X that performs first service, while a second user 4 may create a class plug-in Y that performs a second service. The class plug-X and class plug-in Y may be used to perform two completely different services, but they both utilize the structure of the abstract class from the ISF worker base 330 in order to perform a service within the class plug-in X and Y. For example, the two users 4 may both utilize an e-mail service within the structure of the abstract class, but the first user 4 may be using it to send an e-mail when an account reaches a specific amount, while the second user 4 may be using it to send an e-mail when a customer requests information over a web-site. The process of sending the e-mail doesn't change only the class plug-in that determines the event for which the e-mail is sent.

When a user 4 develops the class plug-in the user 4 inherits the structure of the abstract class. If a user 4 does not adhere to the rules of the abstract class the user 4 will receive an error that the class plug-in cannot be complied when the user 4 tries to compile the class plug-in. In order for a class plug-in developed by a user 4 to compile properly the user 4 has to develop the class plug-in within the structure of the abstract class.

In some embodiments of the invention, a user 4 may change or add one or more abstract class structures to the ISF worker base 330 in order to allow different structures within the integrated service framework 300 that can be used by different users 4 to create additional class plug-ins. In some embodiments of the invention, user access to the abstract class stored through the use of the ISF worker base 330 may be limited in order to control the users 4 who can access and change the code in the abstract class. In some embodiments access may be controlled by a username and password or other security features.

The class plug-ins created by the user 4 may be developed and executed by incorporating the structure of the abstract class, such that the users 4 are all developing programs using the same structure. Therefore, the commands being used within the integrated service framework are the same, and thus, allow all the services to receive and respond to the same commands within the integrated service framework 300. The commands may include, for example, channel commands, interval commands, or switch commands. The channel commands allow the class plug-in to respond to commands within the integrated service framework 300 to perform services and report the results of requested information when the information is requested. The interval commands allow the class plug-in to perform services and report the results of the requested information for the desired interval (e.g., every 10 min, 20 min, 30 min, or another interval). The switch commands allow the class plug-in to receive commands for starting, stopping, pausing, and resuming the services. The commands as a whole can be used to perform a service, monitor the service, query specific business information, or change the behavior of the service by using the ISF service controller 380 as described in further detail later.

In some embodiments, the user 4 may be required to incorporate the commands within the class plug-in even if they do not use the commands to perform a task within the service. For example, an abstract class may include structure to send an e-mail when an account balance drops below a specified lower level and when it increases above a specified upper level. However, the user may only require an e-mail sent when the account balance drops below the specified lower level. In some embodiments, the class-plug in may still require the user to set an upper level or create a dummy upper level even though the class plug-in will not execute the e-mail for the upper level in order to stay within the structure of the abstract class. The code to implement the e-mail may be required in the class plug-in in order to stay within the rules of the abstract class of the integrated service framework 300. Therefore, the command functions may be included in the class plug-in but the code to execute the command functions may not be included. There may also be secondary abstract class functions that are utilized to perform steps or tasks within various services. For example, when a user 4 shuts down a service using the primary function switch command, the integrated service framework 300 recognizes that a service is being shut down and knows that a set of secondary functions should be performed to shut down the service. As is the case with the primary functions, the secondary functions also may be included in the class plug-in, in order to stay within the structure of the abstract class, but the code to execute the functions may not be required when it is not necessary.

The class plug-ins may also use the structure of the abstract class for built-in monitoring and tracking services within the integrated service framework 300. For example, the integrated service framework 300 may provide structure in the abstract class for monitoring statistics related to a service, for example, the duration that the service runs. The class plug-in may utilize the structure within the abstract class in the integrated service framework 300 to provide statistics to the user 4 for monitoring, troubleshooting, etc.

The ISF worker base 330 also acts as a proxy between the ISF service manager 350 and the ISF worker plug-in 310, as illustrated by FIG. 3. If the class plug-in wants to communicate with the client it may not do so directly since the class plug-in and client application may be located on different platforms, or the code may not allow the programs to communicate with each other. Therefore, when the class plug-in wants to communicate with the client, it may communicate through the ISF worker base 330 and/or ISF service manager 350.

The ISF service manager 350 is the product that actually runs the services developed by the user 4 within the integrated service framework 300. The ISF service manager 350 functions as the service installer, such that it looks for the class plug-in developed by the user 4 and properly configures itself for executing the class plug-in. The installer provides an easy way to assemble the files to run the service. The installer first installs the ISF service manger 350, the class plug-in, the abstract class, and configuration files in the target directory, and once the files are extracted the installer installs and registers the service within the integrated service framework 300 or the operating system.

The ISF service manager 350 supports interval based execution and multi-threaded based execution of the services created by the user 4. For interval based execution of services the ISF service manager 350 employs (e.g., executes) the class plug-in at pre-configured intervals. The pre-configured intervals are controlled through the use of the commands in the class plug-in or the text in the configuration file (as explained in further detail later). While in the case of multi-threaded based execution of the services, the ISF service manager 350 passes channel commands to the class plug-in as they are received from the user 4 (e.g., the administrator) through the service controller 380. The channel commands allow the class plug-in to respond to commands over the communication protocol and report results as they are received to the user 4. The ISF service manager 350 sends commands to execute the identified class plug-ins to perform a service, identify service information, or change the behavior of the service.

The ISF service manager 350 also has the ability to self-adjust to the execution of the class plug-ins. The user 4 may write the code for the class plug-in to perform a task every two to three minutes. If the task takes over three minutes on a consistent basis the ISF service manager 350 may self-adjust the interval to three to four minutes. The self-adjusting feature allows the ISF service manager 350 to modify the class plug-in (or a configuration file related to the class plug-in) to prevent notification errors from occurring on a regular basis. In other words, if the task takes longer than the programed interval the ISF service manager 350 will self-adjust the program to the actual interval. Otherwise stated, the service manager self-adjusts to prevent redundant notification errors from occurring when a service consistently (e.g., occurs greater than 25 percent, 40 percent, 50 percent, 60 percent, 70 percent, 80 percent, 90 percent, etc. of the time) runs outside of its parameters in order to provide more accurate notifications (e.g., occur less than 1 percent, 5 percent, 10 percent, 20 percent, etc. of the time.

The ISF service manager 350 also provides for inter-communication between the services and the clients. In one embodiment the inter-communication between the services and clients (e.g., client applications, programs, interfaces, etc.) occurs by converting the communication between the services and the clients into proper protocols. For example, there may be a web facing client application that is accessed and used by the service created by the user 4. The ISF service manager 350 allows the client web facing application to communicate with the service in a common format.

The ISF service manager 350 also handles the event log, notifications, and various other management tasks (e.g., queuing requests). The event log provides a logging feature in order to log information related to the actions or performance of a service and create an audit trail. The event log allows a user 4 to program and execute classes to allow the ISF service manager 350 to monitor the service through the use of notifications. For example, the ISF service manager 350 may automatically log the actions of a service and identify threshold limits of the service set by the user 4 (e.g., in the class plug-in) to provide nominal notifications, warning notifications, critical notifications, class plug-in errors, class plug-in warnings, etc. to a user 4 depending on how the service is running. For example, a user 4 that is developing a service that monitors the storage space for a data dump may set up notifications in the class plug-in to monitor the available storage space. The user 4 may program the class plug-in to have the ISF service manager 350 log the storage space available at various intervals and send notifications if the storage space reaches a warning level and/or a critical level, such that an information technology group is notified when the storage space reaches a warning level or critical level, or returns to a normal level. A user 4 may set up these identification levels and notifications for any type of service by programing the class plug-ins to direct the ISF service manager 350 to log the actions of the service and send notifications based on the assigned levels. In some embodiments of the invention the warning levels are created within the structure of the abstract class, and the user 4 need only program the class plug-ins within the framework of the abstract class to develop the notifications.

The ISF service manager 350 is further able to handle multiple requests in a high traffic environment. This ability allows the integrated service framework 300 to be adaptable to handle many different types of services. For example, the ISF service manager 350 is adaptable to handle queuing because it can track the requests on a first in first out and/or a priority basis, such that the user 4 is able to easily code a class plug-in that utilizes the structure in the abstract class in the ISF worker base 330 to prioritize any type of request received based on the received time, priority data in the request, location from which the request was received, etc. The ISF service manger 350 is adept at queuing, in part, because it has the ability to log information occurring within the integrated framework 300.

The ISF service client application program interface (API) 370 provides a suite of products that allow a user 4 to access the services in the integrated service framework 300. The ISF service client API 370 is the programming interface that allows the users 4 to communicate with the ISF service manager 350 and ultimately send and receive commands and information to and from the services. The ISF service client API 370 provides a channel through which all services can talk to each other using the same protocol. The ISF service client API 370 can communicate between the services without knowing the protocol that is used for the services. It allows communication between the client and the services without knowledge of the protocols of the services utilizing the information in the class plug-ins, abstract class, or the configuration files associated with the class plug-ins, because of the structure of integrated service framework 300. The ISF service client API 370 simply relays the command to the ISF service manager 350 and the ISF service manager 350 communicates with the services.

The ISF service client API 370 is also fully documented, such that when the user 4 is working in the interface of the operating system the user 4 only has to place his cursor over something and the integrated service framework 300 tells the user 4 everything about the feature of the interface.

The ISF service API 370 is basically a gateway to the ISF service manager 350. The ISF service client API 370 may include ISF command channel client and contract, a rich set of object string methods, a set of ISF command types and validation, and ISF channel response. These features allow the ISF service API 370 to communicate with the ISF service manager 350 for sending and receiving commands and data to and from the services in the integrated service framework 300. For example, the ISF service controller 380 is an example of one of the products in the ISF service client API 370 that allows the user 4 to communicate with the services.

The ISF service controller 380 is a configurable application that provides monitoring, control, and query capability of the services. The ISF service controller 380 can dynamically create a service interface for monitoring the services via a configuration file that is developed by the user 4. The ISF service controller 380 may access the service through the ISF service client API 370, ISF service manager 350, ISF worker base 330, and/or the ISF worker plug-in 310. The ISF service controller 380 may be used to send commands to the service via the ISF service manager 350 to start, stop, pause, and resume the service (e.g., control). The ISF service controller 380 can also be used to send commands and receive information from throughout the integrated service framework 300 to display the status, statistics, or other information about the services (e.g., monitor), in order to monitor, track, and notify users 4 when issues arise with the services. The ISF service controller 380 can also be used to identify settings related to the service (e.g., query information), such as, is the service running, how often the service is scheduled to run, how long will it run, etc.

The ISF service controller 380 can send commands and receive responses synchronously or asynchronously. Synchronously commands occur when the ISF service controller 380 sends a command and waits to act until it receives a response. Asynchronously commands occur when the ISF service controller 380 sends a command and moves on to another task or turns off while it waits for a response.

Furthermore, the ISF service controller 380 may be used to not only start, stop, pause, and resume ISF services, but also perform these tasks on non-ISF services. In order to start, stop, pause, and resume non-ISF service the ISF service controller 380 communicates with services that are running outside of the integrated service framework 300. The ISF service controller 380 does this by using the ISF service client API 370 to communicate with other client 390 services that run on the operating system.

The ISF service controller 380 can display information about the services that are created through the integrated service framework 300. A user 4 can access an interface for each of the services (e.g., service A interface 382, service B interface 384, service C interface 386, and Nth service interface 388) through the ISF service controller 380. The ISF service controller 380 provides an interface for any service based on the way the user 4 configures the class plug-in and a configuration file. For example, a user 4 may program a class plug-in to have a command that provides a list of the information in a queue. A client or user 4 (e.g., an administrator) might want to see what is on the queue at any particular point in time. The ISF service controller 380 can execute the command embedded in the class plug-in to access the list of everything on the queue and send the information loosely back to the ISF service controller 380 in whatever type of form the information takes. The ISF service controller 380 determines what type of data it is, such as selection data, text data, chart data and displays it the best way the ISF service controller 380 knows how, such as in a pop-up window, table, chart, etc. using the information in the configuration file. The user 4 can actually configure the ISF service controller 380 to take this action without writing any code whatsoever for the interface. For example, the ISF service controller 380 can identify that queue data from the class plug-in is provided in table form. The class plug-in puts the queue table into the proper communication format and sends it through the ISF service manager 350 and the ISF service client API 370, to the ISF service controller 380, which identifies the information as a table and displays the queue data in table form to the user 4.

The service controller 380 displays the interfaces using the type of information received from the class plug-in and a configuration file without the class plug-in and configuration file being link to each other. In one embodiment, the user 4 populates the configuration file with text related to information about the service, such as where the service is stored on a particular server, port, node, etc., how to communicate with the service, and the buttons that are displayed on the interface that used to provide the commands to control, monitor, or query the service. The service controller 380 accesses the configuration file to determine how to communicate with the service and what to display in the interface to allow the user 4 to communicate with the service through the interface. However, again there is no direct relationship in the programming laws between the configuration file and class plug-in. The service controller 380 is what allows the user 4 to control, monitor, or query the service based on the interface provided by the service controller 380 through the text in the configuration file. For example, the service (e.g., the associated class plug-in) may exist on a server someplace within the country (e.g., for example on the integrated service framework system 10). The user 4 is located elsewhere and running a service controller 380 on the user computer system 20 that is communicating with the service. There is a local configuration file on the user computer system 20 that describes to the service controller 380 where the service is located and how to communicate with the service all through the use of text in the configuration file, instead of using code to display various interfaces to the user. The user 4 can develop the configuration file in order to allow the service controller 380 to communicate with the class plug-in, but the configuration is not linked with the class plug-in itself through code, nor does the class plug-in need to be linked with the communication file through code.

In some embodiments of the invention the ISF service controller 380 may periodically ping a service to determine if it still running (e.g., query the service). When the user 4 accesses the ISF service controller 380 the user 4 may receive a notice that indicates that the service is no longer running if it is no longer running, or the interface will be displayed if the service is running. The ping allows the user 4 to periodically check the status of the service, and thereafter, troubleshoot the service it is or is not running properly.

In some embodiments of the invention a single installed instance of the ISF service controller 380 can control multiple services by employing multiple interfaces. However, in other embodiments of the invention multiple ISF service controllers 380 are used to monitor the services within the integrated service framework 300.

FIG. 4 illustrates a service development process 400 that the user 4 utilizes to create the code for the service. As illustrated by block 410, the user 4 programs a class plug-in using the ISF service worker plug-in 310. As illustrated by block 420, the user 4 creates the class plug-in by using the abstract class in the ISF worker base 330 as a framework. The user 4 writes code for the class plug-in 320 using the structure provided by the abstract class in order to produce a program for the desired service that can communicate with the rest of the products within the integrated service framework 300. As illustrated by block 430, the user 4 identifies the information related to the service that the user would like to store in a log for monitoring purposes. The user 4 also identifies the levels of notification, such that a user 4 is notified when a service reaches a warning or critical level (or other levels), or returns to normal levels, as illustrated by block 440. The user 4 also populates a configuration file with text for allowing the service controller 380 to communicate with the service, and provide an interface for the user 4 to execute commands for communicating with the service.

FIG. 5 illustrates the operating service process 500 that is used to identify and run the class plug-in. As illustrated by block 510 the ISF service manager 350 detects the presence of a class plug-in. The ISF service manager 350 identifies and runs the class plug-in as it is directed by a channel command (e.g., command from a user 4 sent through the interface provided by the ISF service controller 380) or by an interval command (e.g., programmed within the class-plug itself or located in a configuration file). As illustrated by block 520 the ISF service manger 350 executes the class plug-in to run the service. Thereafter, as illustrated by block 530, the ISF service manager 350 logs the information according to the requirements defined in the class plug-in. As illustrated by block 540, the ISF service manager 350 provides notifications based on the requirements in the class plug-in, and the logged information.

FIG. 6 illustrates the service monitoring process 600 that is used to send commands to the service, monitor the service, and query the service. As illustrated by block 610, the ISF service controller 380 accesses the configuration file in order to communicate with the class plug-in. Thereafter, the ISF service controller 380 builds the service interface based on the text from the configuration file, as illustrated by block 620. The ISF service controller 380 displays the interface built based on the configuration file, as illustrated by block 630. As illustrated by block 640, the ISF service controller 380 receives instructions from a user 4 through the interface to change the status of the service, such as stopping, starting, pausing, or resuming the service. As illustrated by block 650 the ISF service controller 380 sends the instructions to change the status of the service to the ISF service manager 350 which communicates the instructions to the service. The service then executes the commands. The ISF service controller 380 may also receive instructions from the user 4 to retrieve the status, settings, or statistics related to the service, as illustrated by block 660, which it passes on to the ISF service manager 350. Thereafter, the ISF service controller 380 receives the requested log information related to service from the ISF service manager 350, as illustrated by block 670. As illustrated by block 680 the ISF service controller 380 displays the log information on the configurable service interface based on the text populated by the user 4 in the configuration file.

FIG. 7 provides one example of the ISF service controller 380 for a queue manager interface 700. The queue manager interface 700 is generated without the need for a user 4 drafting code to specifically display the queue manager interface 700. The buttons 702 (e.g., icons or interactive areas of the interface) are functionally and dynamically produced by allowing the ISF service controller 380 to read the configuration file associated with the service. For example, in the case of the queue manager interface 700 illustrated in FIG. 7, the queue manager configuration file is read by the service controller 380, which then communicates with the queue manager service. The user 4 can program the class plug-in to allow the ISP service manger 350 to communicate information to the ISF service controller 380 which can read the configuration file in order to display buttons 702 to the user 4 in the queue manager interface 700. In some embodiments of the invention there may be two types of buttons 702 provided through the ISF service controller 380, the working buttons 704 that turn the service on and off and the command buttons 706 that send commands to provide reports. Again, there is no coding required on the client side to access the service and obtain this information. All that a user 4 has to do is add the buttons in the form of text to a configuration file in order to have the service controller 380 display the buttons that can be used to send commands to the service or display reports related to the service. The user 4 stores text in the configuration file to provide the buttons that the user 4 wants to use as the working buttons 704 for controlling the service, or the command buttons 706 for accessing information through the queue manager interface 700.

The queue manager interface 700 illustrated in FIG. 7 has working buttons 704 that can start, pause and stop the service that runs the queue manager service. The queue manager interface 700 also has command buttons 706 that will give the user 4 a report of various statuses, settings, and statistics associated with the queue. The ISF service controller 380 can read the text in the configuration file and set up the queue manager interface 700 to display the buttons 702 that the user 4 wants to display and track, and thereafter, link the buttons 702 to the proper commands sent by the ISF service controller 380. For example, the queue manager interface 700 can control the overall service using the working buttons 704 or review reports within the overall service using the command buttons 706. Finally, the user 4 can use the queue manager interface 700 to check the reports associated with the queue, the processing information, open requests, queue status, state of the queue, ISF worker settings, ISF worker statistics, etc., as illustrated in FIG. 7.

A user 4 (e.g. administrator) may select a command button 706 to review a report related to a queue. For example, the user 4 may select the "queue" button and the ISF service controller 380 can display a queue report 800, as illustrated in FIG. 8. The queue report 800 may illustrate the pending or completed actions taken by an application, the ID of the user that made the request, the sequence in which the actions were performed, and the beginning and ending date and time, etc.

In other embodiments of the invention the ISF service controller 380 may display a resource monitor interface 900 as illustrated in FIG. 9. The resource monitor interface 900 may also have buttons 902 comprising worker buttons 904 and command buttons 906. The worker buttons 904 can tell the resource monitor service to start, pause, and stop. The command buttons 906 may provide information related to the storage space for the resource monitor service indicating the storage status, shares status, share pair down, shares down, share pairs, worker settings, and worker statistics. The command buttons 906 on the resource monitor interface 900 are used to check the source status, computer status, which shares are down, etc. Again the ISF service controller 380 is not programmed by a user 4 to display this information in a specific way, instead, the ISF service controller 380 only displays the resource monitor interface 900 based on the text provided in the configuration file associated with the class plug-in responsible for the resource monitor service. Thereafter, the ISF service controller 380 provides the information captured by the ISF service manager 350 in the log to the interface to allow a user 4 (e.g., administrator) to view the information about the service that the user 4 may utilize to monitor, troubleshoot, and remedy issues related to the service.

FIG. 10 illustrates an example of a report provided related to the storage status in a storage status interface 1000, which may be displayed after selecting the storage status button in the resource manager interface 900. As illustrated by FIG. 10 the ISF service controller 380 can display information related to the last storage check time, the last condition, the last notification, a critical storage determination, free storage space, storage path, alert threshold, warning threshold, critical threshold, notification frequency, contact notification, etc. in the storage status interface 1000. This information may be displayed by the ISF service controller 380 simply by accessing the configuration file associated with the class plug-in running the service in order to determine what information to display, and accessing the associated logged information to display the actual information.

The interfaces provided by the ISF service controller 380 prevents the need for a user 4 to program specific interfaces for every service in order to troubleshoot any issues, thus, saving programming time and cost. The user 4 only needs to populate the configuration file with text information related to the location of the service and the buttons 702, 902 to provide in the interface, and thereafter, the service controller 380 accesses the logged information based on the configuration file and the class plug-in and displays the information to the user 4 when requested. The ISF service controller 380 allows the user 4 to monitor, troubleshoot, and remedy any issues in easily navigable interfaces without having to search through code, logged information, etc. to identify any issues associated with the service.

In some embodiments of the invention the integrated service framework 300 is particularly suited for use within financial institutions. Financial institutions may utilize tasks within applications that could be shared across various applications within the financial institution. Thus, the integrated service framework 300 would be particularly useful for allowing a user within a financial institution to create applications through the use of an ISF service worker plug-in 310 product that allows the user to write code to develop class plug-ins 320. While writing the code for the class plug-ins 320 the user in the financial institution would utilize the ISF worker base 330 to develop the class plug-ins 320 within the structure of an abstract class having universal code for methods that are already in place to perform tasks within the various applications that used the class plug-ins 320.

In one example, financial institutions provide account statuses, account statements, notification alerts, purchasing alerts, etc. to customers using various applications. The user may utilize a single class plug-in 320 for an e-mail function that sends notifications based on account information within the framework of the abstract class. This single class plug-in 320 may be utilized across various types of applications to send e-mails based on various occurrences within the financial institution.

In another example, financial institutions use monitoring applications to identify any processing errors that occur within the financial institution applications, and thereafter, provide notifications of the status of the applications to employees of the financial institution to deal with any errors identified. These monitoring applications within the financial institution may use redundant tasks to monitor the applications and notify the employees when potential issues arise. A class plug-in 320 may be utilized to perform the task across more than one monitoring application.

In this way, there are many instances of redundant tasks within the applications at the financial institution that could benefit from using universal class plug-ins 320 to reduce the need for redundant programming, as well as create consistency throughout the applications developed within the integrated service framework system 10. The integrated service framework 300 within the financial institution reduces the time and costs associated with developing services for the employees or customers of the financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for an integrated service framework with products for programming within an operating system, the system comprising:
    a memory device having computer readable program code store thereon;
    a communication device; and
    a processing device operatively coupled to the memory device, and the communication device, wherein the processing device is configured to execute the computer readable program code to:
        provide a worker base product and a worker plug-in product within an integrated service framework;
        wherein the worker base product accesses an abstract class that provides a structure for developing one or more class plug-ins;
        wherein the worker plug-in product is used by a user to develop the one or more class plug-ins and one or more configuration files for a service; and
        allow a user to develop a service by
            developing the one or more class plug-ins within the structure of the abstract class, wherein the user develops the code for a portion of the service in the one or more class plug-ins and accesses standardized code for a portion of the services in the abstract class within the integrated service framework; and
            editing the one or more configuration files with text related to information about the service, wherein the information comprises a location of the service, how to communicate with the service, and buttons for commands to include in a service interface for the service, wherein the service interface is used for monitoring the service, wherein the one or more configuration files are not linked with the one or more class plug-ins associated with the service, and wherein the one or more configuration files are used to create the service interface for the service without developing code in the one or more class plug-ins to create the service interface.

2. The system of claim 1, wherein the abstract class provides the structure in which the user is forced to develop the code for the one or more class plug-ins, wherein the structure requires the user to include command functions from the abstract class within the one or more class plug-ins without executing the command functions.

3. The system of claim 1, wherein a second user edits one or more second configuration files with text related to information about the service, wherein the information comprises a location of the service, how to communicate with the service, and buttons for commands to include in a second service interface for the service, wherein the second service interface is used for monitoring the service, wherein the one or more second configuration files are not linked with the one or more class plug-ins associated with the service, and wherein the one or more second configuration files are used to create the second service interface for the service without developing code in the one or more class plug-ins to create the service interface.

4. The system of claim 1, wherein the abstract class incorporates one or more secondary abstract classes without the one or more class plug-ins directly incorporating the one or more secondary abstract classes, wherein the secondary abstract classes are executed within the integrated service framework without being included in the one or more class plug-ins.

5. The system of claim 1, wherein the one or more class plug-ins or the abstract class include code that a service manger product uses to store service information in a log.

6. The system of claim 1, wherein the one or more class plug-ins or the abstract class include code for threshold limits that a service manager product uses to provide notifications to users when the services violate the threshold limits.

7. The system of claim 1, wherein processing device is further configured to execute the computer readable program code to allow the user to amend the abstract class to change the structure or add new structure to the abstract class for use by the one or more class plug-ins.

8. A computer program product, the computer program product comprising at least one non-transitory computer-readable medium having computer-readable program code portions embodied therein, the computer-readable program code portions comprising:
    an executable portion configured for providing a worker base product and a worker plug-in product within an integrated service framework;
    an executable portion configured for allowing the worker base product to access an abstract class that provides a structure for developing one or more class plug-ins;
    an executable portion configured for allowing a user to use the worker plug-in product to develop one or more class plug-ins and configuration files for a service; and
    an executable portion configured for allowing a user to develop a service by
        developing the one or more class plug-ins within the structure of the abstract class, wherein the user develops the code for a portion of the service in the one or more class plug-ins and accesses standardized code for a portion of the services in the abstract class within the integrated service framework; and
        editing the one or more configuration files that comprise text associated with stored locations of the services, how to communicate with the services, and buttons for commands to include in a service interface for the service, wherein the service interface is used for monitoring the service, wherein the one or more configuration files are not linked with the one or more class plug-ins associated with the service, and wherein the one or more configuration files are used to create the service interface for the service without developing code in the one or more class plug-ins to create the service interface.

9. The computer program product of claim 8, wherein the abstract class provides the structure in which the user is forced to develop the code for the one or more class plug-ins, wherein the structure requires the user to include command functions from the abstract classes within the one or more class plug-ins without executing the command functions.

10. The computer program product of claim 8, wherein a second user edits one or more second configuration files with text related to information about the service, wherein the information comprises a location of the service, how to communicate with the service, and buttons for commands to include in a second service interface for the service, wherein the second service interface is used for monitoring the service, wherein the one or more second configuration files are not linked with the one or more class plug-ins associated with the service, and wherein the one or more second configuration files are used to create the second service interface for the service without developing code in the one or more class plug-ins to create the service interface.

11. The computer program product of claim 8, wherein the abstract class incorporates one or more secondary abstract classes without the one or more class plug-ins directly incorporating the one or more secondary abstract classes, wherein the secondary abstract classes are executed within the integrated service framework without being included in the one or more class plug-ins.

12. The computer program product of claim 8, wherein the one or more class plug-ins or the abstract class include code that a service manger product uses to store service information in a log.

13. The computer program product of claim 8, wherein the one or more class plug-ins or the abstract class include code for threshold limits that a service manager product uses to provide notifications to users when the services violate the threshold limits.

14. The computer program product of claim 8, wherein the computer-readable program code portions further comprise an executable portion configured for allowing the user to amend the abstract class to change the structure or add new structure to the abstract class for use by the one or more class plug-ins.

15. A method comprising:
providing, by a processor, a worker base product and a worker plug-in product within an integrated service framework;
allowing, by the processor, the worker base product to access an abstract class that provides a structure for developing one or more class plug-ins;
allowing, by the processor, a user to use the worker plug-in product to develop one or more class plug-ins for a service; and
allowing, by a processor, a user to develop a service by developing the one or more class plug-ins within the structure of the abstract class, wherein the user develops the code for a portion of the service in the one or more class plug-ins and accesses standardized code for a portion of the services in the one or more abstract classes within the integrated service framework; and
editing the one or more configuration files that comprise text associated with stored locations of the services, how to communicate with the services, and buttons for commands to include in a service interface for the service, wherein the service interface is used for monitoring the service, wherein the one or more configuration files are not linked with the one or more class plug-ins associated with the service, and wherein the one or more configuration files are used to create the service interface for the service without developing code in the one or more class plug-ins to create the service interface.

16. The method of claim 15, wherein the abstract class provides the structure in which the user is forced to develop the code for the one or more class plug-ins, wherein the structure requires the user to include command functions from the abstract classes within the one or more class plug-ins without executing the command functions.

17. The method of claim 15, wherein a second user edits one or more second configuration files with text related to information about the service, wherein the information comprises a location of the service, how to communicate with the service, and buttons for commands to include in a second service interface for the service, wherein the second service interface is used for monitoring the service, wherein the one or more second configuration files are not linked with the one or more class plug-ins associated with the service, and wherein the one or more second configuration files are used to create the second service interface for the service without developing code in the one or more class plug-ins to create the service interface.

18. The method of claim 15, wherein the abstract class incorporates one or more secondary abstract classes without the one or more class plug-ins directly incorporating the one or more secondary abstract classes, wherein the secondary abstract classes are executed within the integrated service framework without being included in the one or more class plug-ins.

19. The method of claim 15, wherein the one or more class plug-ins or the abstract class includes code that a service manger product uses to store service information in a log.

20. The method of claim 15, wherein the one or more class plug-ins or the abstract class include code for threshold limits that a service manager product uses to provide notifications to users when the services violate the threshold limits.

21. The method of claim 15, further comprising:
allowing the user to amend the abstract class to change the structure or add new structure to the abstract class for use by the one or more class plug-ins.

* * * * *